US009934097B2

(12) United States Patent
Tian et al.

(10) Patent No.: US 9,934,097 B2
(45) Date of Patent: Apr. 3, 2018

(54) METHOD AND APPARATUS FOR STARTUP OF A CENTRAL PROCESSING UNIT AND A COMPUTER SYSTEM

(71) Applicant: Huawei Technologies Co., Ltd., Shenzhen (CN)

(72) Inventors: Kai Tian, Nanjing (CN); Jian Yu, Nanjing (CN); Yan Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 19 days.

(21) Appl. No.: 14/950,048

(22) Filed: Nov. 24, 2015

(65) Prior Publication Data

US 2016/0154700 A1    Jun. 2, 2016

(30) Foreign Application Priority Data

Nov. 28, 2014    (CN) .......................... 2014 1 0709138

(51) Int. Cl.
*G06F 11/14* (2006.01)
*G06F 12/06* (2006.01)
(Continued)

(52) U.S. Cl.
CPC ...... *G06F 11/1417* (2013.01); *G06F 11/1469* (2013.01); *G06F 12/0653* (2013.01);
(Continued)

(58) Field of Classification Search
CPC .... G06F 9/4406; G06F 9/4408; G06F 9/4401; G06F 9/4418; G06F 11/1417; G06F 21/575
See application file for complete search history.

(56) References Cited

U.S. PATENT DOCUMENTS 7,765,393 B1 *  7/2010  Lee ..................... G06F 11/1417
                                            713/2
8,006,125 B1 *  8/2011  Meng .................. G06F 11/1417
                                            714/6.2
(Continued)

FOREIGN PATENT DOCUMENTS

CN    103473098 A    12/2013
EP     1710696 A1    10/2006
EP     2846261 A1     3/2015

OTHER PUBLICATIONS

Wikipedia's Booting historical version from Nov. 23, 2014 https://en.wikipedia.org/w/index.php?title=Booting&oldid=635085160.*
(Continued)

*Primary Examiner* — Joseph O Schell
(74) *Attorney, Agent, or Firm* — Conley Rose, P.C.

(57) ABSTRACT

A startup method and apparatus, and a computer system. When a CPU fails to start a system, receiving, by a startup apparatus, a backup area selection instruction, where the backup area selection instruction is used to instruct the startup apparatus to read a boot loader from a backup area of Nand-Flash; receiving a program read instruction sent by the CPU, where the program read instruction includes a primary area address of the boot loader in the Nand-Flash; acquiring a backup address of the boot loader in the Nand-Flash from a correspondence between primary and backup addresses according to the primary area address; reading the boot loader from the backup address; and sending the boot loader to the CPU, such that the CPU starts the system according to the boot loader.

13 Claims, 8 Drawing Sheets

(51) Int. Cl.
*G06F 9/44* (2018.01)
*G06F 21/57* (2013.01)

(52) U.S. Cl.
CPC .......... *G06F 9/4401* (2013.01); *G06F 9/4408* (2013.01); *G06F 21/575* (2013.01); *G06F 2201/84* (2013.01)

(56) References Cited

U.S. PATENT DOCUMENTS

| | | | |
|---|---|---|---|
| 9,411,688 B1* | 8/2016 | Poolla | G06F 11/1417 |
| 2006/0212692 A1* | 9/2006 | Ueno | G06F 11/1417 |
| | | | 713/1 |
| 2007/0050611 A1* | 3/2007 | Weikel | G06F 9/4406 |
| | | | 713/2 |
| 2007/0266202 A1* | 11/2007 | Mukaida | G06F 9/4401 |
| | | | 711/103 |
| 2007/0277027 A1* | 11/2007 | Kim | G06F 9/4401 |
| | | | 713/1 |
| 2009/0138754 A1* | 5/2009 | Edwards | G06F 9/4403 |
| | | | 714/6.11 |
| 2011/0055540 A1* | 3/2011 | Lin | G06F 9/4406 |
| | | | 713/2 |
| 2012/0239972 A1* | 9/2012 | Shibata | G06F 11/1417 |
| | | | 714/15 |

OTHER PUBLICATIONS

Wikipedia's Flash Memory historical version from Nov. 18, 2014 https://en.wikipedia.org/w/index.php?title=Flash_memory&oldid=634305860.*

Foreign Communication From a Counterpart Application, European Application No. 15196449.1, Extended European earch Report dated May 31, 2016, 8 pages.

* cited by examiner

METHOD AND APPARATUS FOR STARTUP OF A CENTRAL PROCESSING UNIT AND A COMPUTER SYSTEM

CROSS-REFERENCE TO RELATED APPLICATION

This application claims priority to Chinese Patent Application No. 201410709138.9, filed on Nov. 28, 2014, which is hereby incorporated by reference in its entirety.

TECHNICAL FIELD

The present disclosure relates to the computer field, and in particular, to a startup method and apparatus, and a computer system.

BACKGROUND

When a computer system is powered on, a boot loader is first executed to boot startup of the system and initialization of hardware.

The boot loader is usually stored using Nand-Flash. When the computer system is powered on, a central processing unit (CPU) may read the boot loader from the Nand-Flash, and write the boot loader into a random access memory (RAM) for execution.

The Nand-Flash usually stores data in blocks. In a write process, the Nand-Flash easily generates a bad block and the bad block cannot be read or written. In this case, once a Block that stores the boot loader becomes a bad block, system startup fails.

In addition, if a power failure occurs in an upgrade process of the boot loader, the boot loader in the Nand-Flash may also be damaged, and the system startup fails.

SUMMARY

The present disclosure provides a startup method and apparatus, and a computer system, which are used to reduce a probability of a system startup failure due to occurrence of a bad block in Nand-Flash.

To achieve the foregoing objective, the following technical solutions are adopted in embodiments of the present disclosure:

According to a first aspect, a startup method is provided, including: when a CPU fails to start a system, receiving, by a startup apparatus, a backup area selection instruction, where the backup area selection instruction is used to instruct the startup apparatus to read a boot loader from a backup area of a memory, where the memory is Nand-Flash; receiving a program read instruction sent by the CPU, where the program read instruction includes a primary area address of the boot loader in the Nand-Flash; acquiring a backup address of the boot loader in the Nand-Flash from a correspondence between primary and backup addresses according to the primary area address, where the correspondence between primary and backup addresses includes a correspondence between the primary area address and the backup address; reading the boot loader from the backup address in the Nand-Flash; and sending the boot loader to the CPU, such that the CPU starts the system according to the boot loader.

In a first possible implementation manner of the first aspect, after the acquiring a backup address of the boot loader in the Nand-Flash, the method includes: generating a backup program read instruction according to the backup address, where the backup program read instruction includes the backup address; and the reading the boot loader from the backup address includes: sending the backup program read instruction to the Nand-Flash to read the boot loader from the backup address.

With reference to the first aspect or the first possible implementation manner of the first aspect, in a second possible implementation manner, before the sending the boot loader to the CPU, the method includes: detecting whether a first Block that is read is a bad block, and when it is determined that the first Block is a bad block, changing an address of the first Block in the correspondence between primary and backup addresses to an address of a next Block adjacent to the first Block, where the first Block is any Block in the backup area, and the backup area of the Nand-Flash includes at least two Blocks; and sending a reset indication message to a reset apparatus, such that when receiving the reset indication message, the reset apparatus controls the system to reset and sends the backup area selection instruction to the startup apparatus.

According to a second aspect, a startup apparatus is provided, including: a first receiving unit configured to receive a backup area selection instruction when a CPU fails to start a system, where the backup area selection instruction is used to instruct the startup apparatus to read a boot loader from a backup area of a memory, where the memory is Nand-Flash; a second receiving unit configured to receive a program read instruction sent by the CPU, where the program read instruction includes a primary area address of the boot loader in the Nand-Flash; an acquiring unit configured to acquire a backup address of the boot loader in the Nand-Flash from a correspondence between primary and backup addresses according to the primary area address, where the correspondence between primary and backup addresses includes a correspondence between the primary area address and the backup address; a storage unit configured to store the correspondence between primary and backup addresses; a reading unit configured to read the boot loader from the backup address in the Nand-Flash; and a sending unit configured to send the boot loader to the CPU, such that the CPU starts the system according to the boot loader.

In a first possible implementation manner of the second aspect, the apparatus further includes: an instruction generating unit configured to generate a backup program read instruction according to the backup address, where the backup program read instruction includes the backup address of the boot loader in the Nand-Flash, where the reading unit is further configured to send the backup program read instruction to the Nand-Flash and read the boot loader from the backup address.

With reference to the second aspect or the first possible implementation manner of the second aspect, in a second possible implementation manner, the startup apparatus further includes: a detecting unit, a changing unit, and an instructing unit, where the detecting unit is configured to detect whether a first Block that is read is a bad block; the changing unit is configured to: when the detecting unit determines that the first Block is a bad block, change an address of the first Block in the correspondence between primary and backup addresses to an address of a next Block adjacent to the first Block, where the first Block is any Block in the backup area, and the backup area of the Nand-Flash includes at least two Blocks; and the instructing unit is configured to send a reset indication message to a reset apparatus, such that when receiving the reset indication message, the reset apparatus controls the system to reset and sends the backup area selection instruction to the startup apparatus.

According to a third aspect, another startup apparatus is provided, which is connected to a memory, where the memory is Nand-Flash, and the startup apparatus includes: a multipath selecting module and a data processing module connected to the multipath selecting module, where the multipath selecting module is configured to receive, when a CPU fails to start a system, a backup area selection instruction sent by a reset apparatus, where the backup area selection instruction is used to instruct the startup apparatus to read a boot loader from a backup area of the Nand-Flash; and is further configured to receive a program read instruction sent by the CPU, where the program read instruction includes a primary area address of the boot loader in the Nand-Flash, and send the program read instruction to the data processing module; and the data processing module is configured to acquire a backup address of the boot loader in the Nand-Flash from a correspondence between primary and backup addresses according to the primary area address in the program read instruction, where the correspondence between primary and backup addresses includes a correspondence between the primary area address and the backup address; and is further configured to read the boot loader from the backup address in the Nand-Flash and send the boot loader to the CPU, such that the CPU starts the system according to the boot loader.

In a first possible implementation manner of the third aspect, the data processing module is configured to: generate a backup program read instruction according to the backup address, where the backup program read instruction includes the backup address of the boot loader in the Nand-Flash; and send the backup program read instruction to the Nand-Flash to read the boot loader from the backup address.

With reference to the third aspect or the first possible implementation manner of the third aspect, in a second possible implementation manner, the data processing module is further configured to: detect whether a first Block that is read is a bad block; when determining that the first block is a bad block, change an address of the first Block in the correspondence between primary and backup addresses to an address of a next Block adjacent to the first Block, where the first Block is any Block in the backup area, and the backup area of the Nand-Flash includes at least two Blocks; and send a reset indication message to a reset apparatus, such that when receiving the reset indication message, the reset apparatus controls the system to reset and sends the backup area selection instruction to the startup apparatus.

With reference to any possible implementation manner from the third aspect to the second possible implementation manner of the third aspect, in a third possible implementation manner, the multipath selecting module includes a first path and a second path, where the multipath selecting module is directly connected to the Nand-Flash using the first path, the multipath selecting module is connected to the data processing module using the second path, and the data processing module is connected to the Nand-Flash; and the multipath selecting module is configured to: send the program read instruction to the data processing module according to the backup area selection instruction using the second path.

With reference to the third possible implementation manner of the third aspect, in a fourth possible implementation manner, the multipath selecting module is further configured to receive a control instruction sent by the CPU; and send, to the Nand-Flash according to the control instruction using the first path, a received data read instruction sent by the CPU, where the data read instruction is an instruction that is sent by the CPU after the system is started and that is used to read data from the Nand-Flash.

According to a fourth aspect, a computer system is provided, which includes a CPU, a memory, and a reset apparatus, and further includes a startup apparatus, where the memory is Nand-Flash, and the startup apparatus is separately connected to the CPU, the reset apparatus, and the Nand-Flash; the startup apparatus is the startup apparatus described in any possible implementation manner from the second aspect to the second possible implementation manner of the second aspect, or the startup apparatus is the startup apparatus described in any possible implementation manner from the third aspect to the fourth possible implementation manner of the third aspect; the Nand-Flash includes a primary area and a backup area, where the primary area and the backup area each store a boot loader; the reset apparatus is configured to send a backup area selection instruction to the startup apparatus when the CPU fails to start the system, where the backup area selection instruction is used to instruct the startup apparatus to read the boot loader from the backup area of the Nand-Flash; and the CPU is configured to send a program read instruction to the startup apparatus, receive the boot loader returned by the startup apparatus, and run the boot loader to start the system.

Using the foregoing solutions, a primary area and a backup area of Nand-Flash each store a boot loader; in a case in which a program read instruction sent by a CPU remains unchanged, a startup apparatus reads, according to a backup area selection instruction sent by a reset apparatus, the boot loader in the backup area of the Nand-Flash, and returns the boot loader to the CPU. Compared with the prior art in which a CPU can read only a boot loader from a primary area of Nand-Flash, the present disclosure reduces a probability of a computer system startup failure caused by occurrence of a bad block in the primary area.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
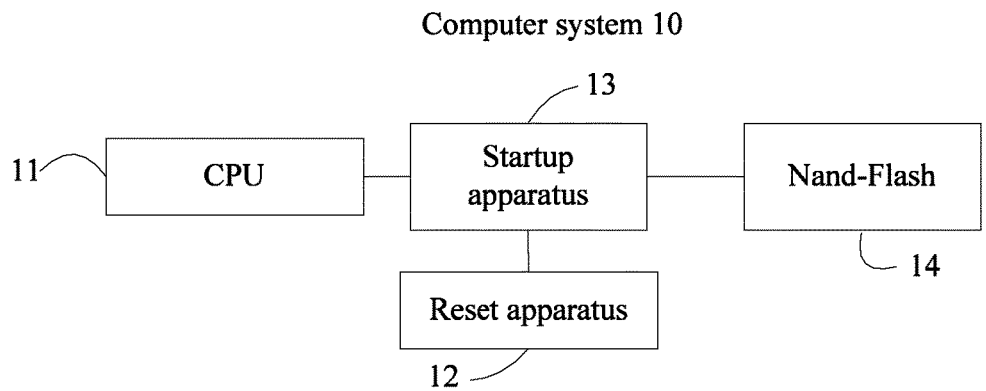
FIG. 1 is a schematic diagram of a structure of a computer system according to an embodiment of the present disclosure.

FIG. 1 shows a schematic diagram of a structure of a computer system 10 according to an embodiment of the present disclosure, where the computer system 10 includes: a CPU 11, a memory, a reset apparatus 12 and a startup apparatus 13.

The memory is Nand-Flash 14, and the startup apparatus 13 is separately connected to the CPU 11, the Nand-Flash 14, and the reset apparatus 12.

The Nand-Flash 14 includes a primary area and a backup area, where the primary area and the backup area each store a boot loader.

The reset apparatus 12 is configured to send a backup area selection instruction to the startup apparatus 13 when the CPU 11 fails to start the system, where the backup area selection instruction is used to instruct the startup apparatus to read the boot loader from the backup area of the memory.

The startup apparatus 13 is configured to control the CPU 11 to start the boot loader that is stored in the primary area or backup area of the Nand-Flash 14. The startup apparatus 13 is configured to: when the CPU 11 fails to start the system, receive the backup area selection instruction sent by the reset apparatus 12; receive a program read instruction sent by the CPU 11, where the program read instruction includes a primary area address of the boot loader in the Nand-Flash 14; acquire a backup address of the boot loader in the Nand-Flash 14 from a correspondence between primary and backup addresses according to the primary area address, where the correspondence between primary and backup addresses includes a correspondence between the primary area address and the backup address; read the boot loader from the backup address in the Nand-Flash 14; and send the boot loader to the CPU 11.

The CPU 11 is configured to send the program read instruction to the startup apparatus 13, receive the boot loader returned by the startup apparatus 13, and run the boot loader to start the system.

When the computer system 10 is powered on and started for the first time, the CPU 11 sends a program read instruction to the Nand-Flash 14 and reads the boot loader from the primary area of the Nand-Flash 14. If a bad block exists in the primary area of the Nand-Flash 14, the CPU 11 cannot read the bad block. Alternatively, the CPU 11 successfully reads the boot loader from the primary area of the Nand-Flash 14, but the boot loader is damaged because of a power failure that occurs during an upgrade. When either of the foregoing two cases occurs, an error occurs when the CPU runs the boot loader, and as a result, the reset apparatus 12 controls the system to reset.

When controlling the system to reset, the reset apparatus 12 sends the backup area selection instruction to the startup apparatus 13. In this way, after the computer system resets, the CPU 11 re-sends the program read instruction. After receiving the program read instruction re-sent by the CPU 11, the startup apparatus 13 reads the boot loader from the backup address in the Nand-Flash 14 and sends the boot loader to the CPU 11.

Each time after controlling the system to reset, the reset apparatus 12 sends a high and low level inversion signal to the startup apparatus 13, and the startup apparatus 13 may choose, according to a high level or a low level, to read the boot loader from the primary area or the backup area of the Nand-Flash 14. For example, when the reset apparatus 12 outputs the low level to the startup apparatus 13, the startup apparatus 13 chooses to read the boot loader from the primary area of the Nand-Flash 14; when the reset apparatus 12 outputs the high level to the startup apparatus 13, the startup apparatus 13 chooses to read the boot loader from the backup area of the Nand-Flash 14, and in this case, the backup area selection instruction is the high level output by the reset apparatus 12.

Therefore, using the foregoing computer system, the startup apparatus in the computer system enables the CPU not to perceive that the Nand-Flash is divided into the primary area and the backup area, and backs up and stores the boot loader. In a case in which the program read instruction sent by the CPU remains unchanged, the boot loader in the backup area of the Nand-Flash is read according to the backup area selection instruction sent by the reset apparatus, and the boot loader is returned to the CPU, which reduces a probability of a computer system startup failure caused by occurrence of a bad block in the primary area.

Figure 2:
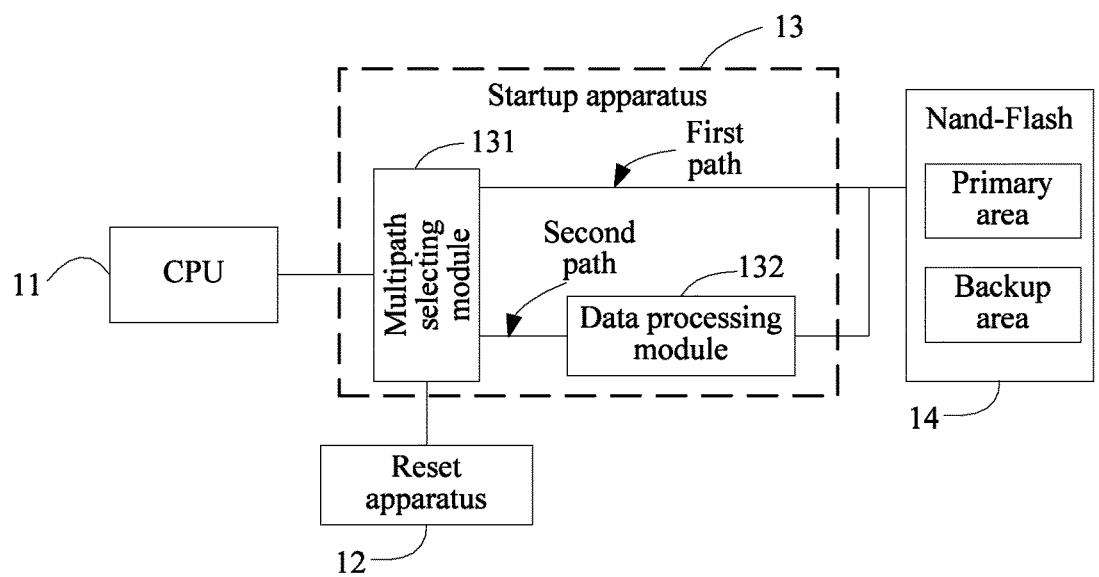
FIG. 2 is a schematic diagram of a structure of another computer system according to an embodiment of the present disclosure.

As shown in FIG. 2, the startup apparatus 13 provided in this embodiment of the present disclosure may include a multipath selecting module 131 and a data processing module 132, where the multipath selecting module 131 is separately connected to the CPU 11 and the Nand-Flash 14. Further, the multipath selecting module 131 is directly connected to the Nand-Flash 14 using a first path, such that the CPU 11 may directly access the primary area of the Nand-Flash 14. The multipath selecting module 131 is connected to the data processing module 132 using a second path, and the data processing module is connected to the Nand-Flash 14, such that the CPU 11 may access the backup area of the Nand-Flash 14 using the data processing module 132. The multipath selecting module 131 selects the first path or the second path by receiving an instruction sent by the reset apparatus.

The multipath selecting module 131 is configured to: when the CPU 11 fails to start the system, receive the backup area selection instruction sent by the reset apparatus 12, where the backup area selection instruction is used to instruct the startup apparatus 13 to read the boot loader from the backup area of the Nand-Flash 14; and is further configured to receive the program read instruction sent by the CPU 11 and send the program read instruction to the data processing module 132, where the program read instruction includes the primary area address of the boot loader in the Nand-Flash 14.

The data processing module 132 is configured to: acquire the backup address of the boot loader in the Nand-Flash 14 from the correspondence between primary and backup addresses according to the primary area address in the program read instruction, where the correspondence between primary and backup addresses includes the correspondence between the primary area address and the backup address; and is further configured to read the boot loader from the backup address in the Nand-Flash 14 and send the boot loader to the CPU 11.

When the system is powered on and started for the first time, and when the multipath selecting module 131 receives the program read instruction sent by the CPU 11, the multipath selecting module 131 directly sends the program read instruction to the Nand-Flash 14 using the first path, such that the CPU 11 reads the boot loader from the primary area of the Nand-Flash 14. After receiving the backup area selection instruction sent by the reset apparatus 12, the multipath selecting module 131 sends, to the data processing module 132 using the second path, the received program read instruction sent by the CPU 11.

Further, after acquiring the backup address of the boot loader in the Nand-Flash 14, the data processing module 132 generates a backup program read instruction according to the backup address and sends the backup program read instruction to the Nand-Flash to read the boot loader from the backup address, where the backup program read instruction includes the backup address of the boot loader in the Nand-Flash 14.

It should be noted that after receiving the program read instruction, the data processing module 132 may also modify the program read instruction and read the boot loader from the backup address in the Nand-Flash 14 according to a modified program read instruction, where the modified program read instruction includes the backup address of the boot loader in the Nand-Flash 14. This embodiment of the present disclosure sets no limit thereto.

Further, before sending the boot loader to the CPU 11, the data processing module 132 detects whether a first Block that is read is a bad block, and when it is determined that the first Block is a bad block, changes an address of the first Block in the correspondence between primary and backup addresses to an address of a next Block adjacent to the first Block, where the first Block is any Block in the backup area, and the backup area of the Nand-Flash 14 includes at least two Blocks.

It should be noted that when the boot loader is written into the Nand-Flash 14, if the first Block is a bad block, the boot loader that should be written into the first Block is written into the next Block whose physical address is adjacent to that of the first Block. Therefore, when determining that the first Block is a bad block, the data processing module 132 needs to change the address of the first Block in the correspondence between primary and backup addresses to the address of the next Block adjacent to the first Block.

If the first Block is a bad block, the corresponding boot loader cannot be read according to the program read instruction sent by the CPU 11, and in this case, the reset apparatus 12 controls the system to reset.

Each time after the reset apparatus 12 controls the system to reset, the backup area selection instruction sent to the multipath selecting module 131 is the high and low level inversion signal. If the multipath selecting module 131 selects the first path when receiving the high level output by the reset apparatus 12, and selects the second path when receiving the low level output by the reset apparatus 12, the startup apparatus switches between the primary area and the backup area to read the boot loader each time after the system resets. Therefore, after changing the correspondence between primary and backup addresses, the startup apparatus may switch to read the boot loader from the primary area of the Nand-Flash 12 using the first path, and after the reset apparatus 12 once again controls the system to reset, the startup apparatus reads the boot loader from the backup area according to a changed correspondence between primary and backup addresses using the second path.

Figure 3:
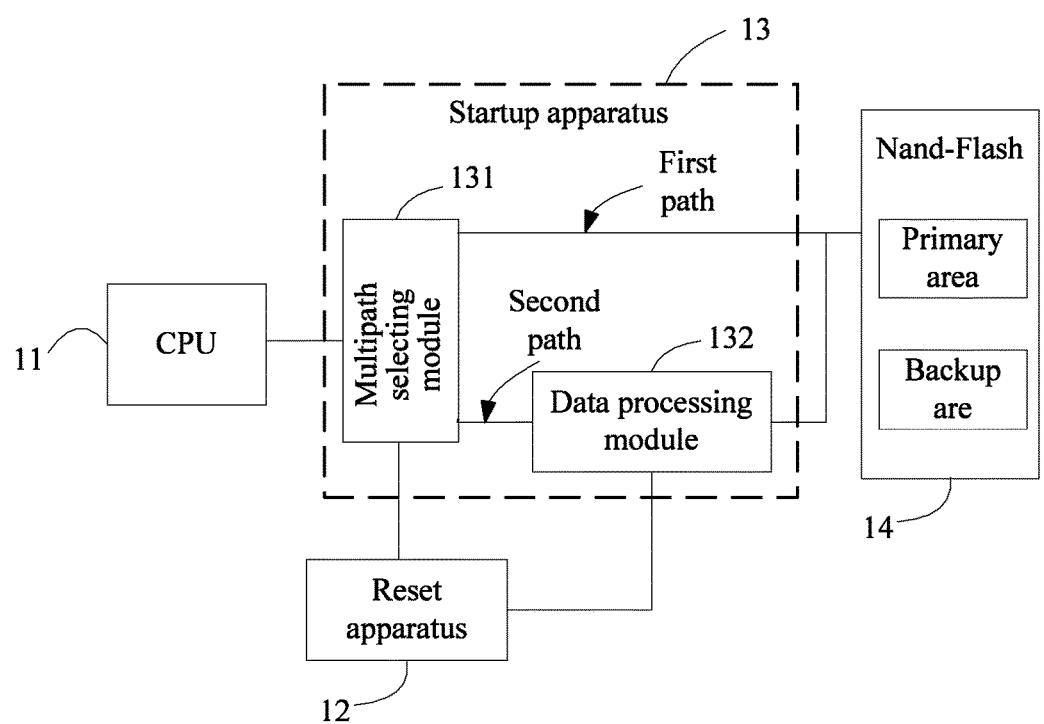
FIG. 3 is a schematic diagram of a structure of still another computer system according to an embodiment of the present disclosure.

In an exemplary implementation manner of this embodiment of the present disclosure, as shown in FIG. 3, the data processing module 132 is connected to the reset apparatus 12. In this way, after detecting that the first Block is a bad block and changing the correspondence between primary and backup addresses, the data processing module 132 sends a reset indication message to the reset apparatus 12, where the reset indication message is used to enable the reset apparatus to control the system to reset, and to send the backup area selection instruction to the multipath selecting module 131.

For example, if the backup area selection instruction is the high level, after receiving the reset indication message sent by the data processing module 132, the reset apparatus 12 controls the system to reset and outputs the high level to the multipath selecting module 131, such that after the system resets, the startup apparatus controls the CPU to continue to read the boot loader from the backup area of the Nand-Flash 14.

In this way, by detecting a bad block and adjusting the stored correspondence between the primary area address and the backup address, it can be ensured that the startup apparatus 13 correctly reads the boot loader from the backup area of the Nand-Flash 14, which avoids a computer system startup failure or switching between the primary area and the backup area for multiple times to read the boot loader, caused by occurrence of a bad block in the Nand-Flash 14.

Further, after receiving the boot loader that is in the backup area of the Nand-Flash 14 and is sent by the startup apparatus 13, and running the boot loader to successfully start the system, the CPU 11 sends a control instruction to the startup apparatus 13, where the control instruction is used to instruct the startup apparatus 13 to directly send a data read instruction to the Nand-Flash 14 after the data read instruction sent by the CPU 11 is received.

The Nand-Flash further stores other data required by the computer system in a running process. As shown in FIG. 2, the data processing module 132 is only suitable for the CPU 11 to read the boot loader from the backup area of the Nand-Flash 14. After the CPU 11 successfully starts the computer system, the second path is no longer required for reading the data from the Nand-Flash 14. Therefore, after starting the computer system, the CPU 11 sends the control instruction to the multipath selecting module 131, and the multipath selecting module 131 sends, to the Nand-Flash 14 according to the control instruction using the first path, the received data read instruction sent by the CPU 11, which ensures that the CPU normally reads data from the Nand-Flash subsequently.

Figure 4:
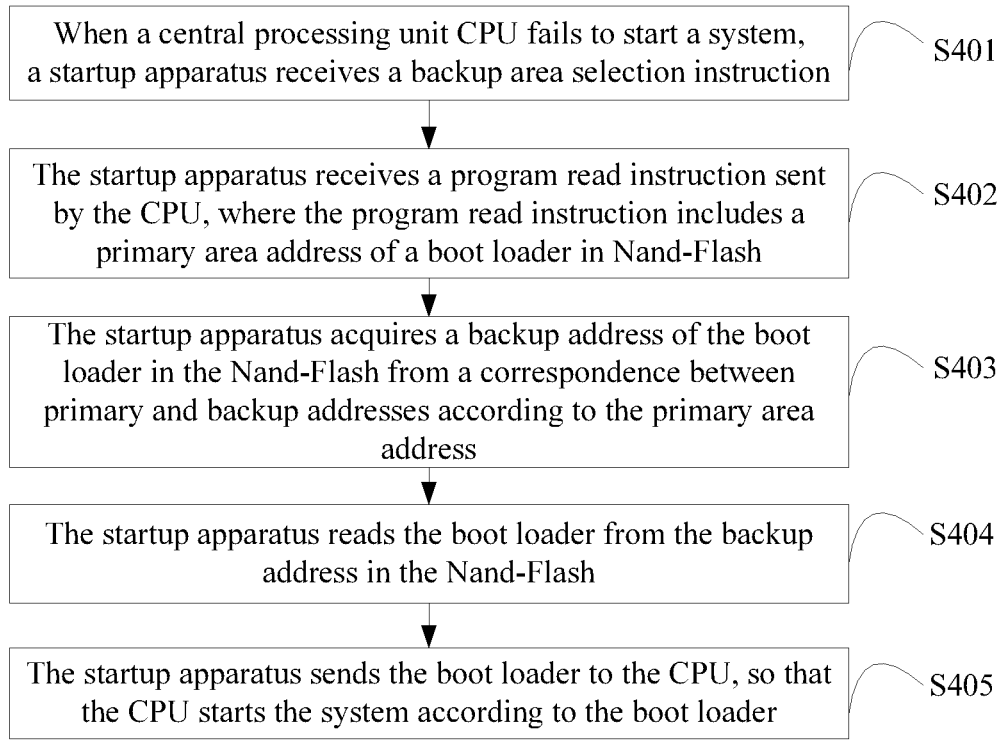
FIG. 4 is a schematic flowchart of a startup method according to an embodiment of the present disclosure.

An embodiment of the present disclosure provides a startup method. As shown in FIG. 4, the method includes:

S401. When a CPU fails to start a system, a startup apparatus receives a backup area selection instruction.

The backup area selection instruction is used to instruct the startup apparatus to read a boot loader from a backup area of a memory. The memory is Nand-Flash.

Exemplarily, when a computer system 10 shown in FIG. 1 is powered on and started for the first time, a CPU 11 sends a program read instruction to Nand-Flash 14 and reads a boot loader from a primary area of the Nand-Flash 14. If a bad block exists in the primary area of the Nand-Flash 14, the CPU 11 cannot read the bad block. Alternatively, the CPU 11 successfully reads the boot loader from the primary area of the Nand-Flash 14, but the boot loader is damaged because of a power failure that occurs during an upgrade. When either of the foregoing two cases occurs, an error occurs when the CPU runs the boot loader, and as a result, a reset apparatus 12 controls system to reset, and sends the backup area selection instruction to the startup apparatus. In this way, after the computer system resets, the CPU 11 re-sends the program read instruction. After receiving the program read instruction, the startup apparatus reads the boot loader from the backup address in the Nand-Flash.

Each time after controlling the system to reset, the reset apparatus sends a high and low level inversion signal to the startup apparatus, and the startup apparatus may choose, according to a high level or a low level, to read the boot loader from the primary area or the backup area of the Nand-Flash. For example, when the reset apparatus outputs the low level to the startup apparatus, the startup apparatus chooses to read the boot loader from the primary area of the Nand-Flash; when the reset apparatus outputs the high level to the startup apparatus, the startup apparatus chooses to read the boot loader from the backup area of the Nand-Flash, and in this case, the backup area selection instruction is the high level output by the reset apparatus.

S402. The startup apparatus receives a program read instruction sent by the CPU, where the program read instruction includes a primary area address of a boot loader in a Nand-Flash.

It should be noted that before and after the system resets, the program read instruction sent by the CPU always includes the primary area address of the boot loader in the Nand-Flash.

S403. The startup apparatus acquires a backup address of the boot loader in the Nand-Flash from a correspondence between primary and backup addresses according to the primary area address.

The correspondence between primary and backup addresses includes a correspondence between the primary area address and the backup address.

The primary area and the backup area of the Nand-Flash each store the boot loader. For example, the primary area of the Nand-Flash includes four blocks: Block0, Block1, Block2 and Block3, and the backup area of the Nand-Flash includes four blocks: Block10, Block11, Block12 and Block13. Block10 serves as a backup of Block0 and stores a same program as Block0; Block11 serves as a backup of Block1 and stores a same program as Block1; Block12 serves as a backup of Block2 and stores a same program as Block2; Block13 serves as a backup of Block3 and stores a same program as Block3.

In this case, a user may store the correspondence between primary and backup addresses in the startup apparatus in advance according to initial addresses of the primary area and the backup area, a size of the boot loader, and a block size that are provided when the Nand-Flash is delivered from a factory: a correspondence between an address of Block0 and an address of Block10, a correspondence between an address of Block1 and an address of Block11, a correspondence between an address of Block2 and an address of Block12, and a correspondence between an address of Block3 and an address of Block13.

In this case, the startup apparatus acquires, using the correspondence between primary and backup addresses, the backup address of the boot loader in the backup area according to the primary area address in the program read instruction.

It should be noted that the program read instruction sent by the CPU indicates reading by page, and one Block includes at least one page. That is, the primary area address included in the program read instruction is an address of a page, and the program read instruction further includes a page number of each page and a block number of a block in which the page is located.

Exemplarily, Block0 includes page 0 to page 9 and Block1 includes page 10 to page 19. In this case, if the primary area address of the boot loader is addresses of page 0 to page 11, the startup apparatus determines, according to block numbers of page 0 to page 11 using the correspondence between primary and backup addresses, Block10 corresponding to Block0 and Block11 corresponding to Block1; and the startup apparatus acquires an address of a to-be-read page (that is, the backup address) in Block10 and Block11 according to page numbers of page 0 to page 11.

S404. The startup apparatus reads the boot loader from the backup address in the Nand-Flash.

Optionally, the startup apparatus generates a backup program read instruction according to the backup address and sends the backup program read instruction to the Nand-Flash to read the boot loader from the backup address, where the backup program read instruction includes the backup address of the boot loader in the Nand-Flash.

It should be noted that after receiving the program read instruction, the startup apparatus may modify the program read instruction and reads the boot loader from the backup address in the Nand-Flash according to a modified program read instruction, where the modified program read instruction includes the backup address of the boot loader in the Nand-Flash. This embodiment of the present disclosure sets no limit thereto.

S405. The startup apparatus sends the boot loader to the CPU, such that the CPU starts the system according to the boot loader.

The CPU writes the boot loader read from the backup address in the Nand-Flash into a RAM and runs the boot loader. In this way, compared with the prior art in which a CPU can read only a boot loader from a primary area, this embodiment of the present disclosure reduces a probability of a computer system startup failure caused by occurrence of a bad block in the primary area.

Optionally, before sending the boot loader to the CPU, the startup apparatus detects whether a first Block that is read is a bad block, and when it is determined that the first Block is a bad block, changes an address of the first Block in the correspondence between primary and backup addresses to an address of a next Block adjacent to the first Block. The first Block is any Block in the backup area.

It should be noted that when the boot loader is written into the Nand-Flash, if the first Block is a bad block, the boot loader that should be written into the first Block is written into the next Block whose physical address is adjacent to that of the first Block. Therefore, when determining that the first Block is a bad block, the startup apparatus needs to change the address of the first Block in the correspondence between primary and backup addresses to the address of the next Block adjacent to the first Block.

Exemplarily, when the boot loader is written into the Nand-Flash, if the first Block is a bad block, the first byte in an out of band (OOB) area of the first page in the first Block is rewritten. It should be noted that an initial value of the first byte in an OOB area of each page is 0xFF.

Therefore, detecting, by the startup apparatus, whether the first Block that is read is a bad block may be detecting whether the first byte in the OOB area of the first page in the first Block is 0xEF. If no, the first Block is determined to be a bad block.

In addition, the correspondence between primary and backup addresses may be stored in the startup apparatus in a table form. Table 1 is used as an example for illustration. The address of Block0 corresponds to the address of Block10; the address of Block1 corresponds to the address of Block11; the address of Block2 corresponds to the address of Block12; the address of Block3 corresponds to the address of Block13.

TABLE 1

| Correspondence between primary and backup addresses | | | |
|---|---|---|---|
| Address of Block0 | Address of Block1 | Address of Block2 | Address of Block3 |
| Address of Block10 | Address of Block11 | Address of Block12 | Address of Block13 |

Figure 5:
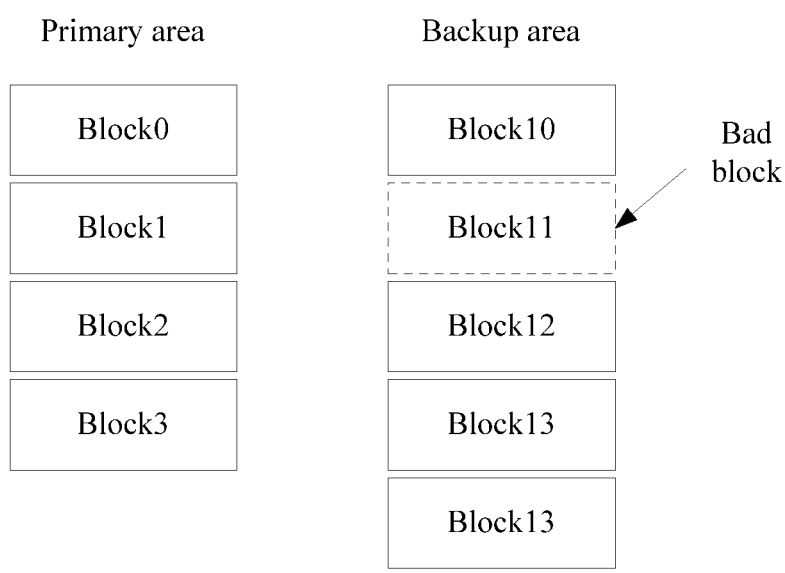
FIG. 5 is a schematic diagram of a primary area and a backup area of Nand-Flash according to an embodiment of the present disclosure.

However, when the boot loader is actually written, a bad Block is skipped and the boot loader is written into a next block. In this case, an actually stored correspondence between primary and backup addresses of the boot loader is inconsistent with a preset correspondence between primary and backup addresses of the boot loader. As shown in FIG. 5, Block11 corresponding to Block1 is a bad block, and in this case, a part of the boot loader written into Block11 is rewritten into Block12. By analogy, a part of the boot loader written into Block12 is rewritten into Block13; a part of the boot loader written into Block13 is rewritten into Block14. Therefore, when the startup apparatus detects a bad block at the backup address, the stored correspondence between primary and backup addresses needs to be changed.

As shown in FIG. 5, Block11 is a bad block. When detecting that Block11 is a bad block, the startup apparatus changes the correspondence between primary and backup addresses. The changed correspondence between primary and backup addresses is shown in Table 2: The address of Block0 corresponds to the address of Block10; the address of Block1 corresponds to the address of Block12; the address of Block2 corresponds to the address of Block13; the address of Block3 corresponds to the address of Block14.

TABLE 2

| Correspondence between primary and backup addresses | | | |
|---|---|---|---|
| Address of Block0 | Address of Block1 | Address of Block2 | Address of Block3 |
| Address of Block10 | Address of Block12 | Address of Block13 | Address of Block14 |

If the first Block is a bad block, the corresponding boot loader cannot be read according to the program read instruction sent by the CPU, and in this case, the reset apparatus controls the system to reset.

Each time after the reset apparatus controls the system to reset, if the backup area selection instruction sent to the startup apparatus is the high and low level inversion signal, the startup apparatus switches between the primary area and the backup area to read the boot loader each time after the system resets. Therefore, after changing the correspondence between primary and backup addresses, the startup apparatus may switch to read the boot loader from the primary area of the Nand-Flash, and after the reset apparatus once again controls the system to reset, the startup apparatus reads the boot loader from the backup area according to the program read instruction sent by the CPU and the changed correspondence between primary and backup addresses.

In an exemplary implementation manner of this embodiment of the present disclosure, after changing the correspondence between primary and backup addresses, the startup apparatus sends a reset indication message to the reset apparatus, where the reset indication message is used to enable the reset apparatus to control the system to reset, and to send the backup area selection instruction to the startup apparatus.

That is, if the backup area selection instruction is the high level, when receiving the reset indication message, the reset apparatus controls the system to reset and outputs the high level to the startup apparatus, such that after the system resets, the startup apparatus controls the CPU to continue to read the boot loader from the backup area of the Nand-Flash.

In this way, by detecting a bad block and adjusting the stored correspondence between the primary area address and the backup address, it can be ensured that the startup apparatus correctly reads the boot loader from the backup area of the Nand-Flash, which avoids a computer system startup failure or switching between the primary area and the backup area for multiple times to read the boot loader, caused by occurrence of a bad block in the Nand-Flash.

Figure 6A:
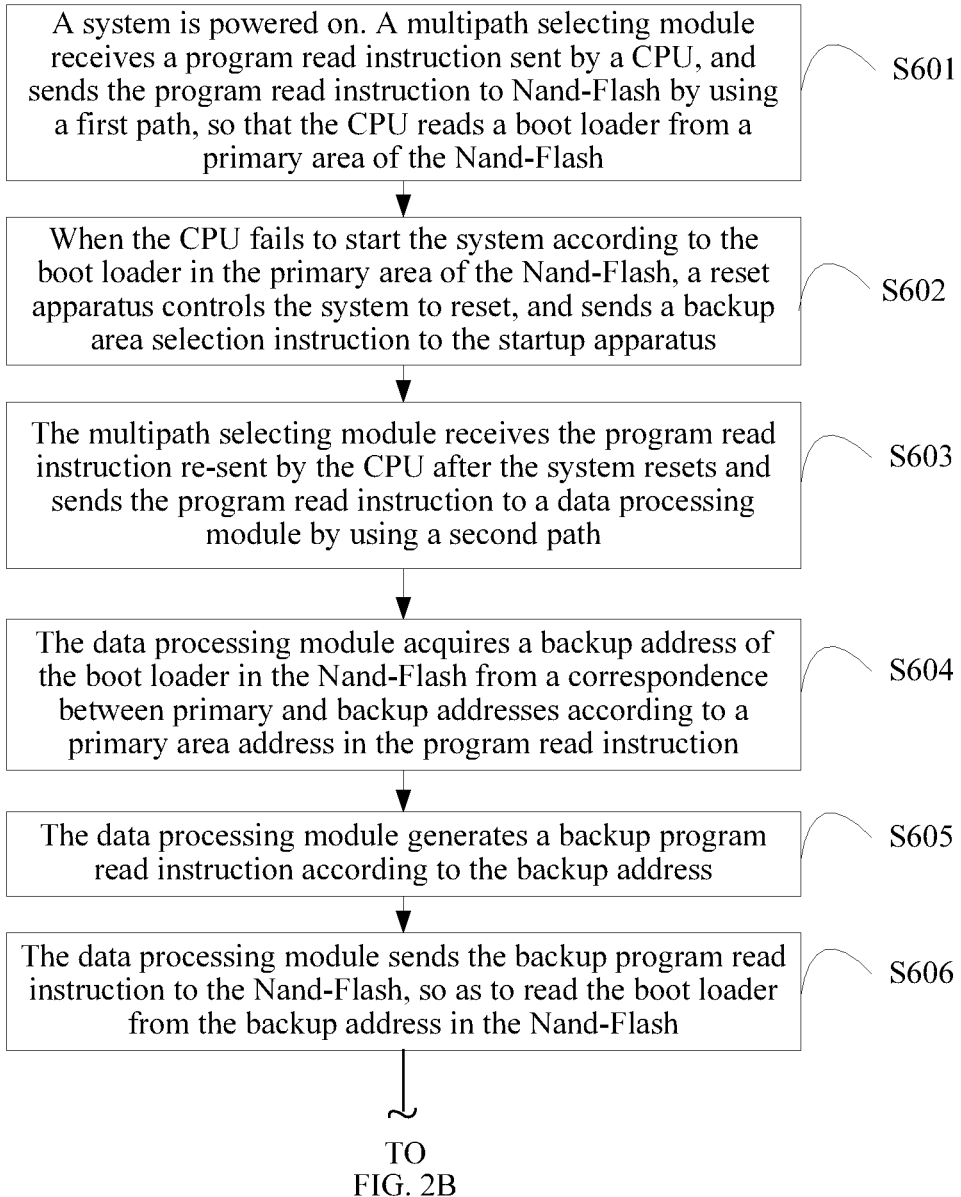
FIG. 6A and FIG. 6B are a schematic flowchart of another startup method according to an embodiment of the present disclosure.
Figure 6B:
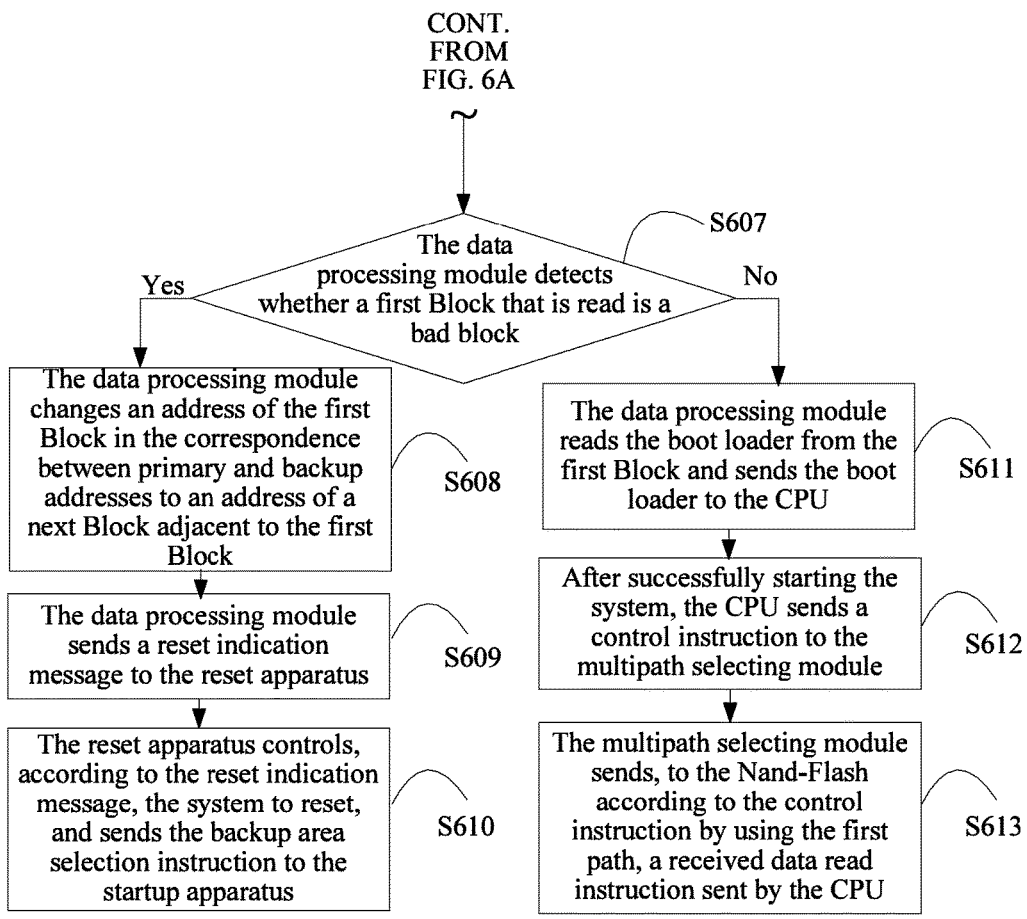

To make a person skilled in the art understand technical solutions of a startup method provided in this embodiment of the present disclosure more clearly, with respect to the computer system provided in FIG. 3, the following describes in detail, using a specific embodiment, the startup method provided in the present disclosure. As shown in FIG. 6A and FIG. 6B, the method includes:

S601. A system is powered on. A multipath selecting module receives a program read instruction sent by a CPU, and sends the program read instruction to Nand-Flash using a first path, such that the CPU reads a boot loader from a primary area of the Nand-Flash.

The program read instruction includes a primary area address of the boot loader in the Nand-Flash.

As shown in FIG. 3, the multipath selecting module is directly connected to the Nand-Flash using the first path, such that the CPU may directly access the primary area of the Nand-Flash. The multipath selecting module is connected to a data processing module using a second path, and the data processing module is connected to the Nand-Flash, such that the CPU may access a backup area of the Nand-Flash using the data processing module. The multipath selecting module selects the first path or the second path by receiving an instruction sent by a reset apparatus. It is preset that the multipath selecting module selects the first path according to output of the reset apparatus when the system is powered on.

S602. When the CPU fails to start the system according to the boot loader in the primary area of the Nand-Flash, a reset apparatus controls the system to reset, and sends a backup area selection instruction to a startup apparatus.

The backup area selection instruction is used to instruct the startup apparatus to read the boot loader from the backup area of the Nand-Flash.

The reset apparatus may monitor running of the boot loader using a watchdog circuit. If the boot loader is normally executed, startup of the system and initialization of hardware are completed; if the boot loader is incorrectly executed or cannot be executed within a preset time, the reset apparatus controls the system to reset.

Each time after controlling the system to reset, the reset apparatus sends a high and low level inversion signal to the startup apparatus, and the startup apparatus may choose, according to a high level or a low level, to read the boot loader from the primary area or the backup area of the Nand-Flash. For example, when the reset apparatus outputs the low level to the startup apparatus, the startup apparatus chooses to read the boot loader from the primary area of the Nand-Flash; when the reset apparatus outputs the high level to the startup apparatus, the startup apparatus chooses to read the boot loader from the backup area of the Nand-Flash, and in this case, the backup area selection instruction is the high level output by the reset apparatus.

S603. The multipath selecting module receives the program read instruction re-sent by the CPU after the system resets, and sends the program read instruction to a data processing module using a second path.

S604. The data processing module acquires a backup address of the boot loader in the Nand-Flash from a correspondence between primary and backup addresses according to a primary area address in the program read instruction.

The correspondence between primary and backup addresses includes a correspondence between the primary area address and the backup address.

Exemplarily, the correspondence between primary and backup addresses is shown in Table 1. For details, reference may be made to the description corresponding to Table 1 in the foregoing method embodiment, and details are not described herein again.

S605. The data processing module generates a backup program read instruction according to the backup address.

S606. The data processing module sends the backup program read instruction to the Nand-Flash so as to read the boot loader from the backup address in the Nand-Flash.

S607. The data processing module detects whether a first Block that is read is a bad block.

The first Block is any Block in the backup area.

Exemplarily, when the boot loader is written into the Nand-Flash, if the first Block is a bad block, the first byte in an OOB area of the first page in the first Block is rewritten. It should be noted that an initial value of the first byte in an OOB area of each page is 0xFF.

Therefore, that the data processing module detects whether the first Block that is read is a bad block includes: detecting whether the first byte in the OOB area of the first page in the first Block is the 0xEF. If no, the first Block is determined to be a bad block.

Further, if the data processing module determines that the first Block is a bad block, step S608 to step S610 are performed; if the data processing module determines that the first Block is not a bad block, step S611 is performed.

S608. The data processing module changes an address of the first Block in the correspondence between primary and backup addresses to an address of a next Block adjacent to the first Block.

It should be noted that when the boot loader is written into the Nand-Flash, if the first Block is a bad block, the boot loader that should be written into the first Block is written into the next Block whose physical address is adjacent to that of the first Block.

As shown in FIG. 5, Block11 is a bad block. When detecting that Block11 is a bad block, the data processing module changes the correspondence between primary and backup addresses. A changed correspondence between primary and backup addresses is shown in Table 2 in the foregoing method embodiment: An address of Block0 corresponds to an address of Block10; an address of Block1 corresponds to an address of Block12; an address of Block2 corresponds to an address of Block13; an address of Block3 corresponds to an address of Block14.

S609. The data processing module sends a reset indication message to the reset apparatus.

S610. The reset apparatus controls, according to the reset indication message, the system to reset, and sends the backup area selection instruction to the startup apparatus.

Exemplarily, it is assumed that the backup area selection instruction is the high level. As shown in FIG. 3, the data processing module is connected to the reset apparatus; in this case, after detecting that the first Block is a bad block and changing the correspondence between primary and backup addresses, the data processing module sends the reset indication message to the reset apparatus, such that when receiving the reset indication message, the reset apparatus controls the system to reset, and sends the high level to the multipath selecting module.

It should be noted that, if an address of a bad block still exists in the changed correspondence between primary and backup addresses, for example, as shown in Table 2 in the foregoing method embodiment, if Block12 is a bad block, when the startup apparatus detects, according to the foregoing steps, that Block12 is a bad block, the data processing module needs to change the correspondence between primary and backup addresses again and sends the reset indication message to the reset apparatus. That is, the startup apparatus cyclically performs the foregoing step S603 to step S610 at least once until an address of a bad block does not exist in the correspondence between primary and backup addresses.

S611. The data processing module reads the boot loader from a first Block and sends the boot loader to the CPU.

The startup apparatus repeatedly performs step S603 to step S611 until the CPU reads the complete boot loader, and runs the boot loader in a RAM to start the system.

S612. After successfully starting the system, the CPU sends a control instruction to the multipath selecting module.

S613. The multipath selecting module sends, to the Nand-Flash according to the control instruction using the first path, a received data read instruction sent by the CPU.

In this way, the startup apparatus enables the CPU not to perceive that the Nand-Flash is divided into the primary area and the backup area, and backs up and stores the boot loader. In a case in which the program read instruction sent by the CPU remains unchanged, the boot loader in the backup area of the Nand-Flash is read according to the backup area selection instruction sent by the reset apparatus, and the boot loader is returned to the CPU, which reduces a probability of a computer system startup failure caused by occurrence of a bad block in the primary area.

Moreover, for brief description, the foregoing method embodiments are represented as a series of actions. However, a person skilled in the art should appreciate that the present disclosure is not limited to the described order of the actions. In addition, a person skilled in the art should also appreciate that the embodiments described in the specification are exemplary embodiments, and the actions and modules involved are not necessarily mandatory to the present disclosure.

Figure 7:
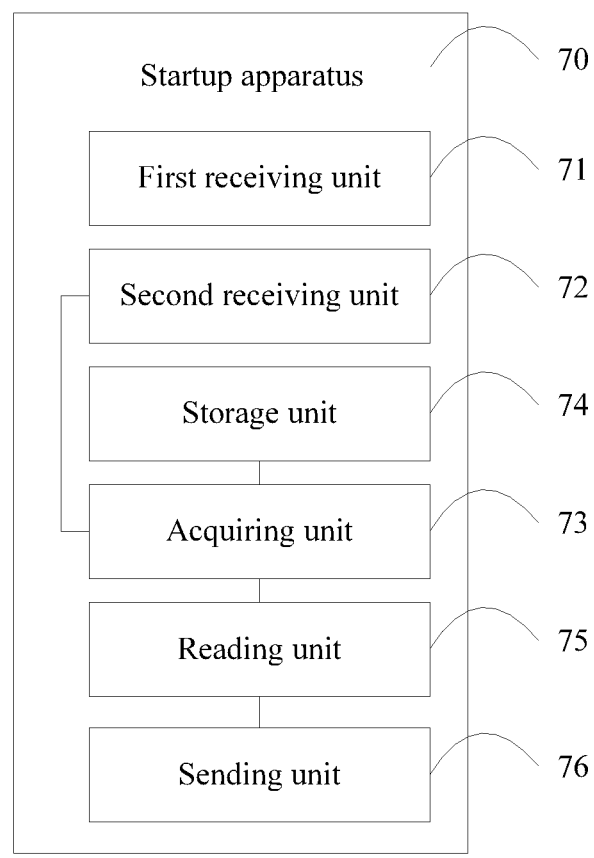
FIG. 7 is a schematic diagram of a structure of a startup apparatus according to an embodiment of the present disclosure.

An embodiment of the present disclosure provides a startup apparatus 70, which is used to implement the startup method described in the foregoing FIG. 4. As shown in FIG. 7, the startup apparatus 70 includes: a first receiving unit 71 configured to receive a backup area selection instruction when a central processing unit CPU fails to start a system, where the backup area selection instruction is used to instruct the startup apparatus to read a boot loader from a backup area of a memory, where the memory is Nand-Flash; a second receiving unit 72 configured to receive a program read instruction sent by the CPU, where the program read instruction includes a primary area address of the boot loader in the Nand-Flash; an acquiring unit 73 configured to acquire a backup address of the boot loader in the Nand-Flash from a correspondence between primary and backup addresses according to the primary area address, where the correspondence between primary and backup addresses includes a correspondence between the primary area address and the backup address; a storage unit 74 configured to store the correspondence between primary and backup addresses; a reading unit 75 configured to read the boot loader from the backup address in the Nand-Flash; and a sending unit 76 configured to send the boot loader to the CPU, such that the CPU starts the system according to the boot loader.

Exemplarily, when a computer is powered on and started for the first time, a CPU sends a program read instruction to Nand-Flash and reads a boot loader from a primary area of the Nand-Flash. If a bad block exists in the primary area of the Nand-Flash, the CPU cannot read the bad block. Alternatively, the CPU successfully reads the boot loader from the primary area of the Nand-Flash, but the boot loader is damaged because of a power failure that occurs during an upgrade. When either of the foregoing two cases occurs, an error occurs when the CPU runs the boot loader, and as a result, a reset apparatus controls the system to reset.

Each time after controlling the system to reset, the reset apparatus sends a high and low level inversion signal to the startup apparatus, and the startup apparatus may choose, according to a high level or a low level, to read the boot loader from the primary area or the backup area of the Nand-Flash. For example, when the reset apparatus outputs the low level to the startup apparatus, the startup apparatus chooses to read the boot loader from the primary area of the Nand-Flash; when the reset apparatus outputs the high level to the startup apparatus, the startup apparatus chooses to read the boot loader from the backup area of the Nand-Flash, and in this case, the backup area selection instruction is the high level output by the reset apparatus.

Therefore, according to the foregoing startup apparatus, the startup apparatus enables the CPU not to perceive that the Nand-Flash is divided into the primary area and the backup area, and backs up and stores the boot loader. In a case in which the program read instruction sent by the CPU remains unchanged, the boot loader in the backup area of the Nand-Flash is read according to the backup area selection instruction sent by the reset apparatus, and the boot loader is returned to the CPU, which reduces a probability of a computer system startup failure caused by occurrence of a bad block in the primary area.

Figure 8:
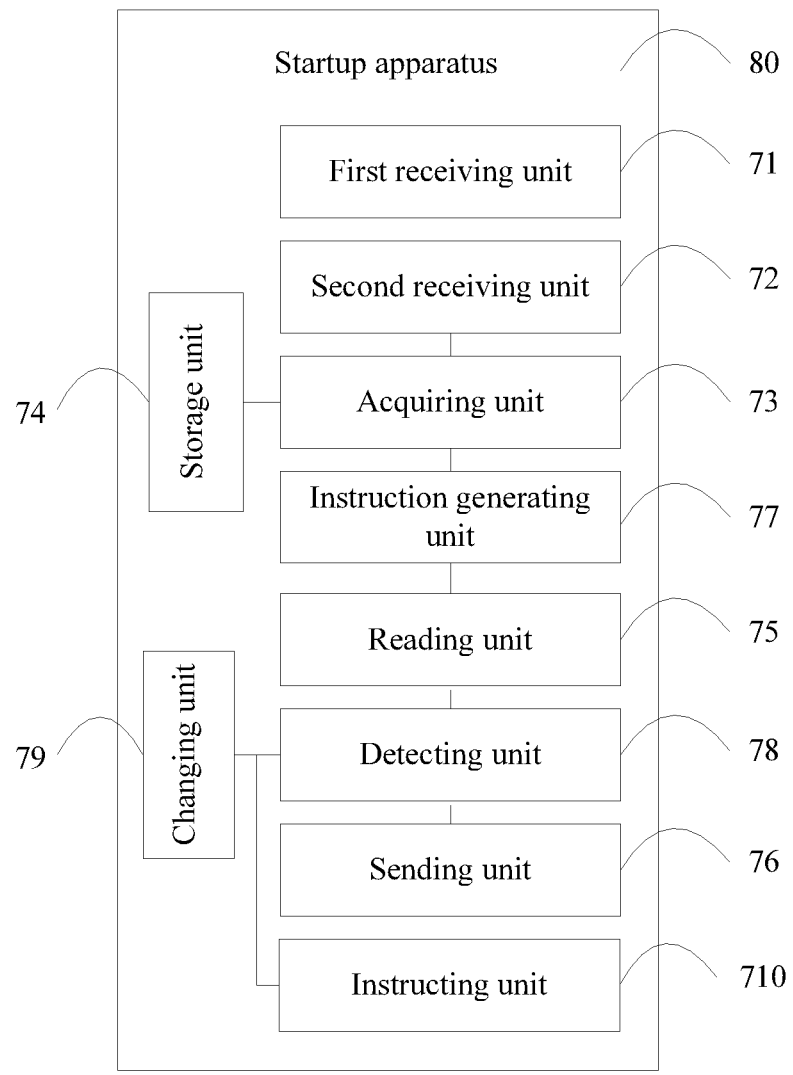
FIG. 8 is a schematic diagram of a structure of another startup apparatus according to an embodiment of the present disclosure.

FIG. 8 shows another startup apparatus 80 provided in an embodiment of the present disclosure, and as a further improvement of the startup apparatus 70, the startup apparatus 80 further includes an instruction generating unit 77, which is configured to generate a backup program read instruction according to the backup address, where the backup program read instruction includes the backup address of the boot loader in the Nand-Flash. The reading unit 75 is further configured to read the boot loader from the backup address in the Nand-Flash according to the backup program read instruction.

Optionally, as shown in FIG. 8, the startup apparatus 80 further includes: a detecting unit 78 configured to detect whether a first Block that is read is a bad block; a changing unit 79 configured to: when the detecting unit determines that the first Block is a bad block, change an address of the first Block in the correspondence between primary and backup addresses to an address of a next Block adjacent to the first Block, where the first Block is any Block in the backup area, and the backup area of the Nand-Flash includes at least two Blocks; and an instructing unit 710 configured to send a reset indication message to the reset apparatus, such that when receiving the reset indication message, the reset apparatus controls the system to reset and send the backup area selection instruction to the startup apparatus.

It should be noted that when the boot loader is written into the Nand-Flash, if the first Block is a bad block, the boot loader that should be written into the first block is written into the next Block whose physical address is adjacent to that of the first Block. Therefore, when determining that the first Block is a bad block, the startup apparatus needs to change the address of the first Block in the correspondence between primary and backup addresses to the address of the next Block adjacent to the first Block.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Figure 9:
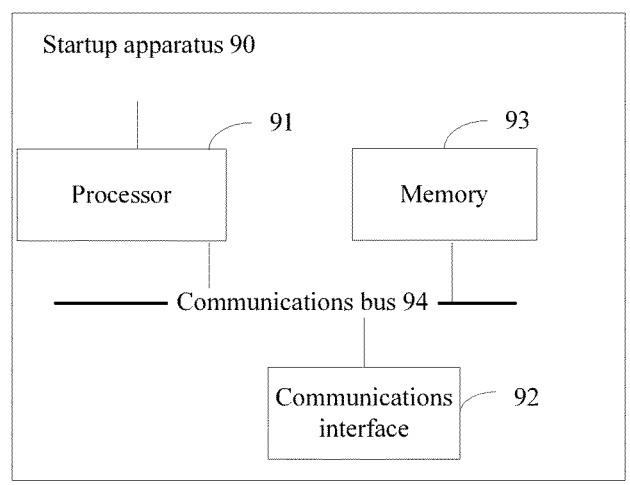
FIG. 9 is a schematic diagram of a structure of still another startup apparatus according to an embodiment of the present disclosure.

As shown in FIG. 9, an embodiment of the present disclosure provides a startup apparatus 90, which is used to implement the startup method described in the foregoing FIG. 4. In the computer system shows in FIG. 1, the startup apparatus 90 implements a function of the startup apparatus 13 and is separately connected to the CPU 11, the reset apparatus 12 and the Nand-Flash 14. The startup apparatus 90 includes: a processor 91, a communications interface 92, a memory 93, and a communications bus 94, where the processor 91, the communications interface 92, and the memory 93 are connected to and communicate with each other using the communications bus 94.

The startup apparatus 90 separately communicates with the CPU 11, the reset apparatus 12, and the Nand-Flash 14 using the communications interface 92.

The processor 91 may be a general purpose processor, which includes a CPU, a network processor (NP) and the like, or may be a digital signal processor (DSP), an application-specific integrated circuit (ASIC), a field programmable gate array (FPGA), or another programmable logical device.

The memory 93 is configured to store program code, where the program code includes a computer operation instruction. The memory 93 may include a high-speed RAM memory, and may further include a non-volatile memory, for example, at least one disk memory.

The processor 91 is configured to execute the program code in the memory 93 to implement the startup method provided in this embodiment of the present disclosure, including: receiving a backup area selection instruction when the CPU 11 fails to start a system, where the backup area selection instruction is used to instruct the startup apparatus 90 to read a boot loader from a backup area of the Nand-Flash 14; receiving a program read instruction sent by the CPU 11, where the program read instruction includes a primary area address of the boot loader in the Nand-Flash 14; acquiring, according to the primary area address, a backup address of the boot loader in the Nand-Flash 14 from a correspondence between primary and backup addresses, where the correspondence between primary and backup addresses includes a correspondence between the primary area address and the backup address; reading the boot loader from the backup address in the Nand-Flash 14; and sending the boot loader to the CPU 11, such that the CPU 11 starts the system according to the boot loader.

The storage unit 93 is further configured to store the correspondence between primary and backup addresses.

Optionally, after the acquiring a backup address of the boot loader in the Nand-Flash 14, the startup method further includes: generating a backup program read instruction according to the backup address, where the backup program read instruction includes the backup address; and the reading the boot loader from the backup address includes: sending the backup program read instruction to the Nand-Flash 14 to read the boot loader from the backup address.

Optionally, before sending the boot loader to the CPU 11, the method further includes: detecting whether a first Block that is read is a bad block, and when it is determined that the first Block is a bad block, changing an address of the first Block in the correspondence between primary and backup addresses to an address of a next Block adjacent to the first Block, where the first Block is any Block in the backup area, and the backup area of the Nand-Flash includes at least two Blocks; and sending a reset indication message to the reset apparatus 12, such that when receiving the reset indication message, the reset apparatus 12 controls the system to reset, and sends the backup area selection instruction to the startup apparatus 90.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for startup of a central processing unit (CPU), comprising:
   receiving a first boot program read instruction from the CPU, wherein the first boot program read instruction comprises a primary area address of a first boot loader stored in a primary area of a Nand-Flash memory;
   allowing the CPU to read the first boot loader, wherein the first boot loader comprises an error that prevents proper execution of the first boot loader;
   receiving a backup area selection instruction from a reset apparatus when the CPU fails to start the first boot loader, wherein the backup area selection instruction is used to instruct a startup apparatus to read a second boot loader from a backup area of the Nand-Flash memory, and wherein the second boot loader is a backup of the first boot loader;
   receiving a second boot program read instruction from the CPU, wherein the second boot program read instruction comprises a primary area address of the first boot loader;
   based on the backup area selection instruction, acquiring a backup area address of the second boot loader from a correspondence between the primary area address and the backup area address;
   reading the second boot loader from the Nand-Flash memory based on the backup area address; and
   sending the second boot loader to the CPU.

2. The method according to claim 1, wherein the method further comprises: generating a backup program read instruction according to the backup area address after acquiring the backup area address, wherein the backup program read instruction comprises the backup area address, and wherein reading the second boot loader from the Nand-Flash memory comprises sending the backup program read instruction to the Nand-Flash memory to read the second boot loader.

3. The method according to claim 1, further comprising, before the sending the second boot loader to the CPU
   detecting whether a first block that is read is a bad block; and
   changing an address of the first block in the correspondence to an address of a next block adjacent to the first block when the first block is a bad block, wherein the first block is any block in a backup area of the Nand-Flash memory, and wherein the backup area comprises at least two blocks; and
   sending a reset indication message to the reset apparatus, such that when receiving the reset indication message, the reset apparatus controls a system to reset and sends the backup area selection instruction to the startup apparatus.

4. An apparatus for startup of a central processing unit (CPU), wherein the apparatus is coupled to a Nand-Flash memory, and wherein the apparatus comprises:
a processor;
a first communications interface coupled to the processor and to the Nand-Flash memory; and
a second communications interface coupled to the processor and to the CPU,
wherein the processor is configured to:
receive a first boot program read instruction from the CPU, wherein the first boot program read instruction comprises a primary area address of a first boot loader stored in a primary area of the Nand-Flash memory;
allowing the CPU to read the first boot loader, wherein the first boot loader comprises an error that prevents proper execution of the first boot loader;
receive a backup area selection instruction from a reset apparatus when the CPU fails to complete the first boot loader, wherein the backup area selection instruction is used to instruct a startup apparatus to read a second boot loader from a backup area of the Nand-Flash memory, wherein the second boot loader is a backup of the first boot loader;
receive a second boot program read instruction from the CPU, wherein the second boot program read instruction comprises a primary area address of the first boot loader;
based on the backup area selection instruction, acquire a backup area address of the second boot loader from a correspondence between the primary area address and the backup area address;
read the second boot loader from the Nand-Flash memory based on the backup area address; and
send the second boot loader to the CPU.

5. The apparatus according to claim 4, wherein the processor is further configured to:
generate a backup program read instruction according to the backup area address, wherein the backup program read instruction comprises the backup area address; and
send the backup program read instruction to the Nand-Flash memory to read the second boot loader.

6. The startup-apparatus according to claim 4, wherein the processor is further configured to:
detect whether a first block that is read is a bad block; and
change an address of the first block in the correspondence to an address of a next block adjacent to the first block when the first block is a bad block, wherein the first block is any block in a backup area of the Nand-Flash memory, and wherein the backup area comprises at least two blocks; and
send a reset indication message to the reset apparatus, such that when receiving the reset indication message, the reset apparatus controls a system to reset and sends the backup area selection instruction to the startup apparatus.

7. The apparatus according to claim 4, wherein the processor is further configured to:
receive a high and low level inversion signal from the reset apparatus when the CPU fails to complete the first boot loader;
in response to the high and low level inversion signal, select a second path wherein a first path is used to access the primary area of the Nand-Flash memory, and wherein the second path is used to access a backup area of the Nand-Flash memory.

8. The apparatus according to claim 7, wherein the processor is further configured to:
receive a control instruction from the CPU after the CPU successfully starts a system by running the second boot loader; and
send, according to the control instruction, a data read instruction to the Nand-Flash memory using the first path, and wherein the data read instruction is an instruction that is from the CPU after the system is started and that is used to read data from the Nand-Flash memory.

9. A computer system, comprising
a central processing unit (CPU);
a reset apparatus;
a Nand-Flash memory comprising a primary area and a backup area, wherein the primary area stores a first boot loader, wherein the backup area stores a second boot loader, and wherein the second boot loader is a backup of the first boot loader; and
a startup apparatus separately connected to the CPU, the reset apparatus, and the Nand-Flash memory,
wherein the reset apparatus is configured to:
send a backup area selection instruction to the startup apparatus when the CPU fails to start the first boot loader, wherein the backup area selection instruction is used to instruct the startup apparatus to read the second boot loader from the backup area of the Nand-Flash memory,
wherein the CPU is configured to:
send a first boot program read instruction to the startup apparatus, wherein the first boot program read instruction comprises a primary area address of the first boot loader;
read the first boot loader, wherein the first boot loader comprises an error that prevents proper execution of the first boot loader; and
send a second boot program read instruction to the startup apparatus, wherein the second boot program read instruction comprises the primary area address of the first boot loader in the Nand-Flash memory;
receive the second boot loader returned by the startup apparatus; and
run the second boot loader,
wherein the startup apparatus is configured to:
receive the first boot program read instruction from the CPU;
receive the backup area selection instruction from the reset apparatus when the CPU fails to start the first boot loader;
receive the second boot program read instruction from the CPU;
based on the backup area selection instruction, acquire a backup area address of the second boot loader from a correspondence between the primary area address and the backup area address; and
read the second boot loader from the Nand-Flash memory based on the backup area address; and
send the second boot loader to the CPU.

10. The computer system according to claim 9, wherein the startup apparatus is further configured to:
generate a backup program read instruction according to the backup area address, wherein the backup program read instruction comprises the backup area address; and
send the backup program read instruction to the Nand-Flash memory to read the second boot loader.

11. The computer system according to claim 9, wherein the startup apparatus is further configured to:
detect whether a first block that is read is a bad block;

change an address of the first block in the correspondence to an address of a next block adjacent to the first block when the first block is a bad block, wherein the first block is any block in a backup area of the Nand-Flash memory, and wherein the backup area comprises at least two blocks; and send a reset indication message to the reset apparatus, such that when receiving the reset indication message, the reset apparatus controls the computer system to reset and sends the backup area selection instruction to the startup apparatus.

12. The computer system according to claim 9, wherein the startup apparatus is further configured to:

receive a control instruction from the CPU after the CPU successfully starts by running the second boot loader; and send, according to the control instruction, a data read instruction to the Nand-Flash memory using a first path, and wherein the data read instruction is an instruction that is from the CPU after the computer system is started and that is used to read data from the Nand-Flash memory.

13. A method for starting up a central processing unit (CPU), wherein the method comprises:

receiving a high and low level inversion signal when a central processing unit (CPU) fails to complete a first boot loader that is stored in a primary area of a Nand-Flash memory, wherein the Nand-Flash memory has a backup area, wherein a second boot loader is stored in the backup area, and wherein the second boot loader is a backup of the first boot loader;

selecting a second path in response to the high and low level inversion signal, wherein a first path is used to access the primary area and the second path is used to access the backup area;

receiving a program read instruction via the second path, wherein the program read instruction comprises a primary area address of the first boot loader;

acquiring a backup area address of the second boot loader from a correspondence between a primary area address for the first boot loader and the backup area address;

reading the second boot loader from the Nand-Flash memory based on the backup area address; and sending the second boot loader to the CPU.

* * * * *

UNITED STATES PATENT AND TRADEMARK OFFICE
CERTIFICATE OF CORRECTION

PATENT NO. : 9,934,097 B2
APPLICATION NO. : 14/950048
DATED : April 3, 2018
INVENTOR(S) : Kai Tian, Jian Yu and Yan Chen Page 1 of 1

It is certified that error appears in the above-identified patent and that said Letters Patent is hereby corrected as shown below:

On the Title Page

On page 2 under Other Publications should read:
"3$^{rd}$ Generation Partnership Project; Technical Specification Group Core Network and Terminals; Conferencing using the IP Multimedia (IM) CoreNetwork (CN) subsystem; Stage 3 (Release 12)," XP050925903, 3GPP TS 24.147, V12.3.0, Technical Specification, Sep. 2014, 209 pages.

On page 2 under Other Publications should read:
Foreign Communication From a Counterpart Application, European Application No. 15196449.1, Extended European Search Report dated May 31, 2016, 8 pages.

In the Claims

Column 19; Line 64; Claim 7 should read:
select a second path, wherein a first path is used to Signed and Sealed this
Twenty-second Day of May, 2018

Andrei Iancu
*Director of the United States Patent and Trademark Office*